United States Patent
Rode

(10) Patent No.: US 7,165,917 B2
(45) Date of Patent: Jan. 23, 2007

(54) APPARATUS FOR DISPOSAL OF TOXIC AND RADIOACTIVE WASTE

(76) Inventor: Christian Stig Rode, 2412 Stearns Hill Rd., Waltham, MA (US) 02451

( * ) Notice: Subject to any disclaimer, the term of this patent is extended or adjusted under 35 U.S.C. 154(b) by 0 days.

(21) Appl. No.: 10/884,029

(22) Filed: Jul. 2, 2004

(65) Prior Publication Data
US 2005/0047870 A1    Mar. 3, 2005

Related U.S. Application Data

(60) Provisional application No. 60/484,479, filed on Jul. 2, 2003.

(51) Int. Cl.
*B09B 1/00* (2006.01)
(52) U.S. Cl. ............... 405/303; 114/67 A; 588/250
(58) Field of Classification Search ............... 588/17, 588/250; 114/67 A; 405/303
See application file for complete search history.

(56) References Cited

U.S. PATENT DOCUMENTS

| | | | |
|---|---|---|---|
| 3,016,865 A | 1/1962 | Eichenberger | |
| 3,041,992 A | 7/1962 | Lee | |
| 3,180,225 A * | 4/1965 | Draim | 89/1.809 |
| 3,548,605 A * | 12/1970 | Paull et al. | 405/60 |
| 3,659,108 A | 4/1972 | Quase | |
| 4,178,109 A | 12/1979 | Krutenat | |
| 4,377,509 A | 3/1983 | Haynes et al. | |
| 4,404,666 A * | 9/1983 | Stevens et al. | 367/131 |
| 4,619,218 A | 10/1986 | Kenny | |
| 4,738,564 A | 4/1988 | Bottillo | |
| 4,877,353 A | 10/1989 | Wisotsky, Sr. | |
| 5,149,906 A * | 9/1992 | August | 89/1.81 |
| 5,245,118 A * | 9/1993 | Cole, Jr. | 588/250 |
| 5,381,751 A | 1/1995 | Richards et al. | |
| 5,733,066 A | 3/1998 | Myers | |
| 2003/0130557 A1 * | 7/2003 | Altersitz | 588/250 |

* cited by examiner

Primary Examiner—John Kreck

(57) ABSTRACT

A new system for underwater waste disposal is disclosed, consisting of a high-speed, hardened penetrator, optional rocket motor (or other compact propulsion device) and alternative mechanisms for eliminating water drag by surrounding the projectile with a gas layer.

8 Claims, 6 Drawing Sheets

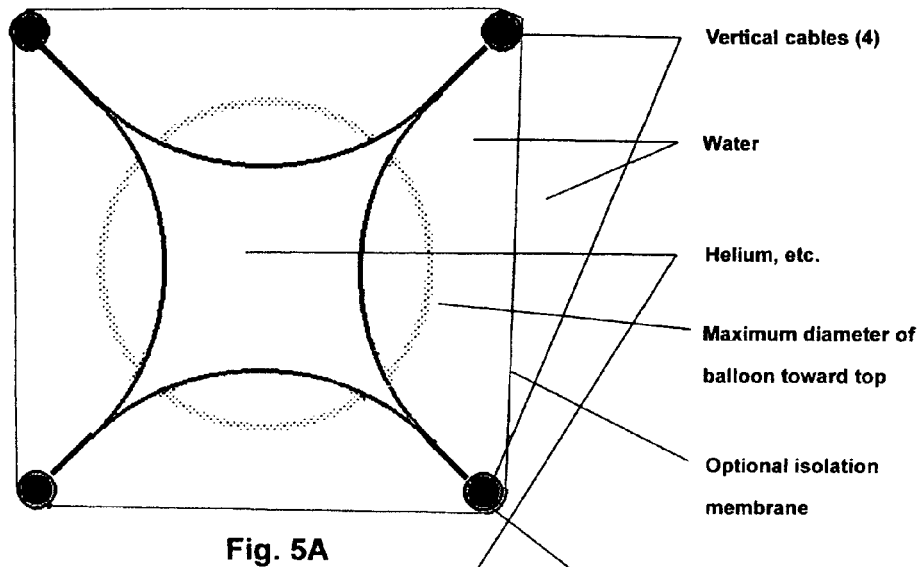
Fig. 5A
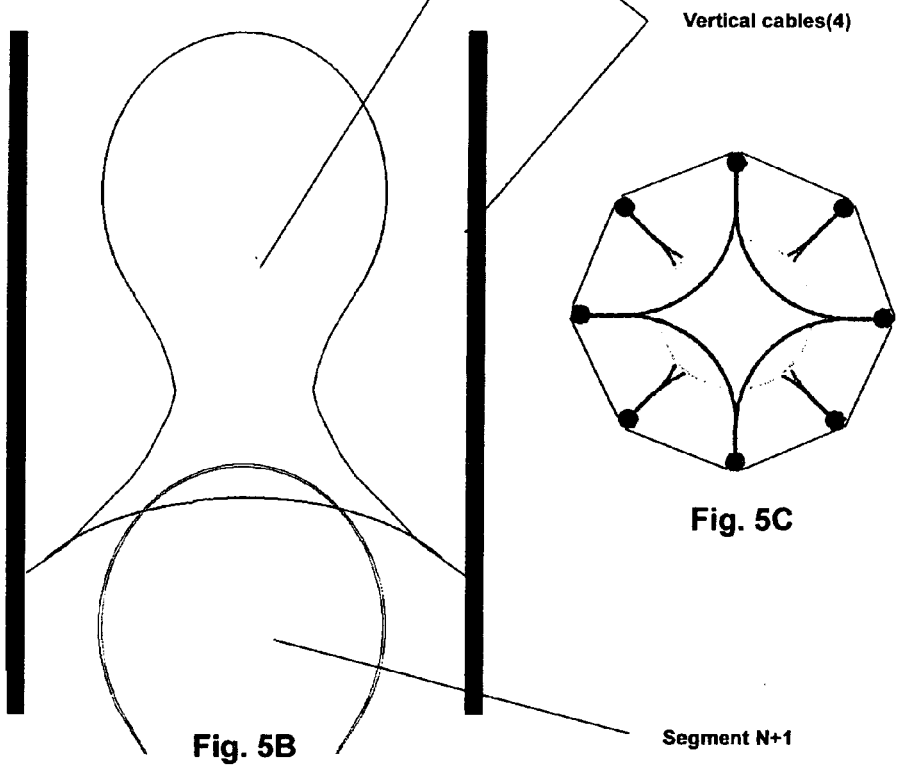
Fig. 5B
Fig. 5C

APPARATUS FOR DISPOSAL OF TOXIC AND RADIOACTIVE WASTE

CROSS REFERENCE TO RELATED APPLICATIONS

The present application claims benefit of Prov. Application 60/484,479, filed Jul. 2, 2003.

STATEMENT REGARDING FEDERALLY SPONSORED RESEARCH OR DEVELOPMENT

Not Applicable

REFERENCE TO A MICROFICHE APPENDIX

None

BACKGROUND OF THE INVENTION

1. Field of the Invention

This invention relates to the fields of waste disposal and underwater rocketry.

2. Description of Prior Art

Construction of containers intended for at-sea disposal of hazardous waste is a known art. For example, Quase, (U.S. Pat. No. 3,659,108) discloses a compressible container for deep-sea disposal of hazardous materials. Haynes, et al. (U.S. Pat. No. 4,377,509) discloses a container in which waste is packed in a wettable material which thereby becomes incompressible.

It is preferable to bury such materials beneath the nominal ocean floor, for example, in pelagic clay sediments or the deep terrigenous sediments that accumulate near continental rises so as to isolate the disposed waste from environmental changes and human accessibility. Wisotsky, Sr. (U.S. Pat. No. 4,877,353) discloses an apparatus for storing hazardous waste in containers that are driven into the seabed. Deese ("Nuclear Power and Radioactive Waste—A Sub-Seabed Disposal Option") discloses and Myers (U.S. Pat. No. 5,733,066) enhances a method for driving canisters into the seabed by means of a free-falling ballistic penetrator. Explosive means have also been disclosed for driving anchors and containers into the seabed. Others have specified burying containers in drilled holes located in subduction zones along tectonic plate boundaries (Krutenat, U.S. Pat. No. 4,178,109).

On land, some (Bottillo, U.S. Pat. No. 4,738,564) have proposed dissolving and diluting nuclear waste in surface lava lakes, however active volcanoes tend to eventually disgorge their contents into the surrounding environment so even if proven practical is likely politically impractical. Lava-lake disposal would seem analogous to current nuclear industry practice of vitrifying high-level (radioactive) waste (HLW) in borosilicate glass, however without careful subsequent storage.

Reduction of water friction drag by interposition of a gas layer between vessel and water is a known art, see U.S. Pat. No. 3,016,865 Eichenberger and U.S. Pat. No. 3,041,992 J. G. Lee.

BRIEF SUMMARY OF THE INVENTION

Previous mechanisms for sea-floor storage of waste have either buried materials to a lesser depth or required expensive drilling. The present invention intends to lower cost by teaching a means of penetrating the seafloor to great depth without a need to drill.

It is an object of the present invention, to encapsulate waste materials in a hard, heavy capsule projectile, and to substantially increase the impact velocity of said projectile with the seabed so as to maximize the depth of penetration into said seabed. In the preferred embodiment, the projectile encloses a distinct inner capsule designed for protection of waste contents from impact, heat, chemical attack or any combination of these.

To minimize drag with the surrounding water, several alternative mechanisms are disclosed. 1) drop the projectile through a vertically-aligned stack of underwater balloons (a "balloon chain") where each successive balloon is popped by passage of the projectile, creating a continuous gas envelope or 2) dynamically create a gas column by timed sequential burning of a chain of vertically-oriented combustibles ("explosives") to evolve large amounts of gas just ahead of the downward-thrusting projectile or 3) encapsulate the projectile in an evolved bubble of hot gas, similar to that used in a supercavitating torpedo, however, new methods are disclosed to match the gas evolution of methods 2 and 3 to the movement and depth of the projectile.

To achieve maximum speed, a solid rocket motor is optionally attached to the end of the projectile. Such motors operate at pressures up to several thousand PSI and consequently are only effective to an ocean depth of a few kilometers where equivalent pressures obtain.

Shear mass of the projectile relative to a minimized cross-section is desirable so as to maximize penetration into ocean sediments and/or basaltic deposits. The minimal cross-section is selected according to the material used and the strength needed to protect the waste contents from deepwater pressures and high impact velocity with the targeted seafloor.

The projectile+capsule may also be designed to be heat tolerant so that it can be launched into the softened rock of a seafloor spreading zone or shallow magma chamber, without immediately melting. It may also be of such a great mass relative to the small footprint of its sharp tip so as to sink deeper purely due to gravity.

References

1. CRC Handbook of Material Science
2. Quase, U.S. Pat. No. 3,659,108
3. Haynes, et al., U.S. Pat. No. 4,377,509
4. Wisotsky, Sr., U.S. Pat. No. 4,877,353
5. Deese ("Nuclear Power and Radioactive Waste—A Sub-Seabed Disposal Option")
6. Myers, U.S. Pat. No. 5,733,066
7. Krutenat, U.S. Pat. No. 4,178,109
8. Bottillo, U.S. Pat. No. 4,738,564
9. Eichenberger, U.S. Pat. No. 3,016,865
10. J. G. Lee, U.S. Pat. No. 3,041,992

BRIEF DESCRIPTION OF THE DRAWINGS

FIG. 2 shows the aftermath of a penetrator that has been launched to and embedded in the sea floor, by means of the preferred embodiment illustrated in FIG. 1a.

FIG. 5A shows an axial cross-section from below of a single balloon in a 4-cable version of the cascadable balloon chain preferred embodiment.

FIG. 5B shows a coronal cross-section of the same embodiment illustrated in FIG. 5A.

FIG. 5C shows an 8-cable modification to the preferred embodiment where successive segments are rotated by 45 degrees to enhance capture of gas spilling from one stage to the next.

DETAILED DESCRIPTION OF THE PREFERRED EMBODIMENTS

In the preferred embodiment, the projectile is a hollow metal "bullet" (i.e., a hollow rocket or arrow-shaped tapered cylinder) composed of any inexpensive material with good hardness, fracture resistance and, for subduction/volcanic applications, a melting point higher than basaltic lava with a drop weight of potentially thousands of tons, encapsulating an inner chamber with highly radioactive waste dissolved in a carrier material, such as depleted uranium, and/or vitrified within glass (e.g., borosilicate glass, silicon carbide, zirconium nitride) with high chemical inertness, radiation tolerance and, for subduction/volcanic applications, high melting point. For the sake of a concrete example, the preferred embodiment uses cast iron as the projectile material. Depleted uranium (DU, possibly alloyed with 0.75% Ti), however, would make an excellent projectile material, and as a bonus contribute to the disposal of this too-abundant material, however, its use would likely be constrained by environmental/political concerns as DU is still somewhat radioactive and uranium is a toxic heavy metal that dissolves slowly in seawater. Iron has no such liabilities, except that it, too, will dissolve slowly in seawater.

An option within the preferred embodiment is that the hollow inner chamber(s) contain(s) a secondary container(s) (for example, a refractory ceramic inner liner) with properties other than sheer mechanical strength, for example, resistance to seawater corrosion or the high heat and corrosive nature of magma. If the waste payload is borosilicate glass, it will be nearly insoluble in seawater, however care must be taken to prevent the contents from shattering upon projectile impact with the sea bottom.

The payload area may be sealed to minimize access of seawater to the payload contents. Alternatively it may be open on descent to equalize pressure and eliminate stress on the projectile structure due to high-pressure at depth. A plurality of payload areas within the projectile may be desirable.

Figure 1:
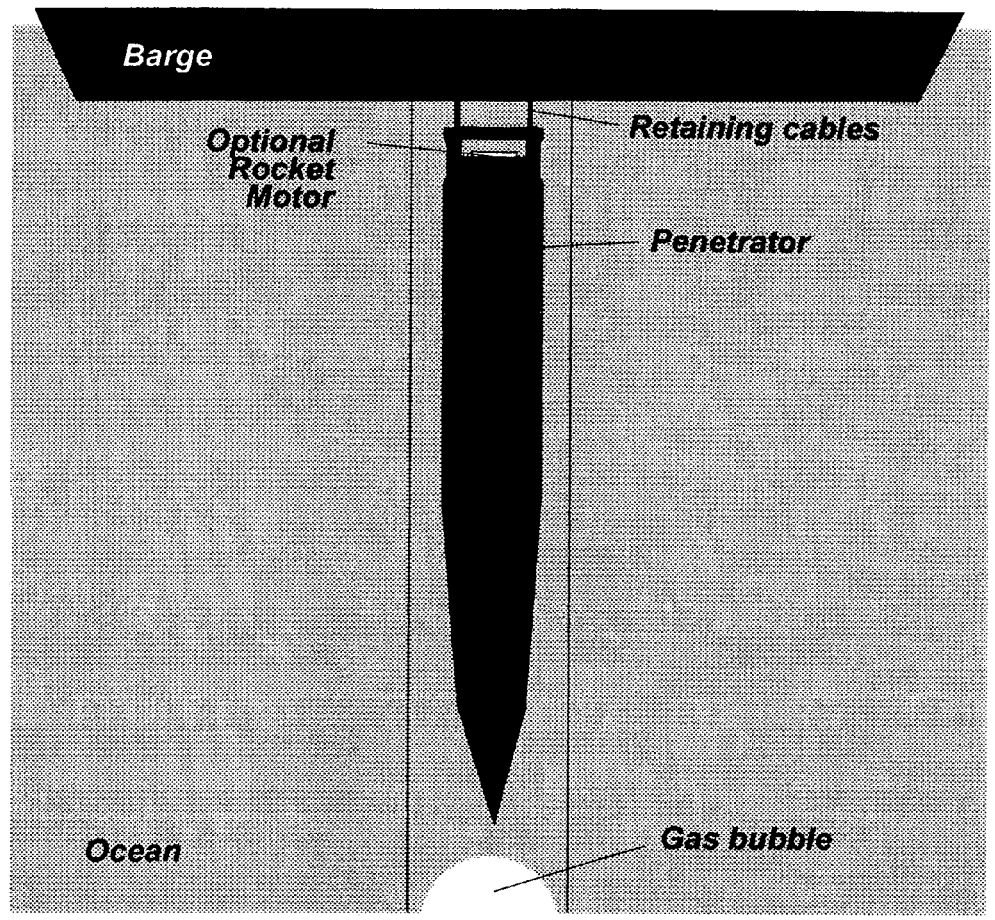
FIG. 1 shows a side view of a downward-pointing penetrator suspended from a barge.

To launch the projectile, it is first attached to a barge or other floating platform and moved to a position directly over the target seafloor site, then vertically erected with its leading edge pointed downwards toward the seafloor (or lakefloor) below. (FIG. 1) The depth of the water above the East Pacific Rise is only 2.5 km and the thickness of the crust is 1.7 km and were such a "bullet" dropped in air, it would be expected to impact at a speed of hundreds of km/hr. Additional propulsion devices (rockets) can provide the thrust to even higher impact speeds of potentially thousands of km/hr. For example, a thousand-ton projectile with a very large solid rocket motor, such as that used on the space shuttle (2.6e6 lbs-force, but with a much-reduced propellant load due to the shortened flight distance), would add an additional 1 G acceleration over gravity in vacuo, with a 41% improvement in impact velocity. A projectile in freefall over 2.5 km in vacuum would reach 221 m/s, with an additional 1 G of thrust, 313 m/s (transsonic). Actual speeds will be significantly lower due to air and incidental water friction.

Figure 1A:
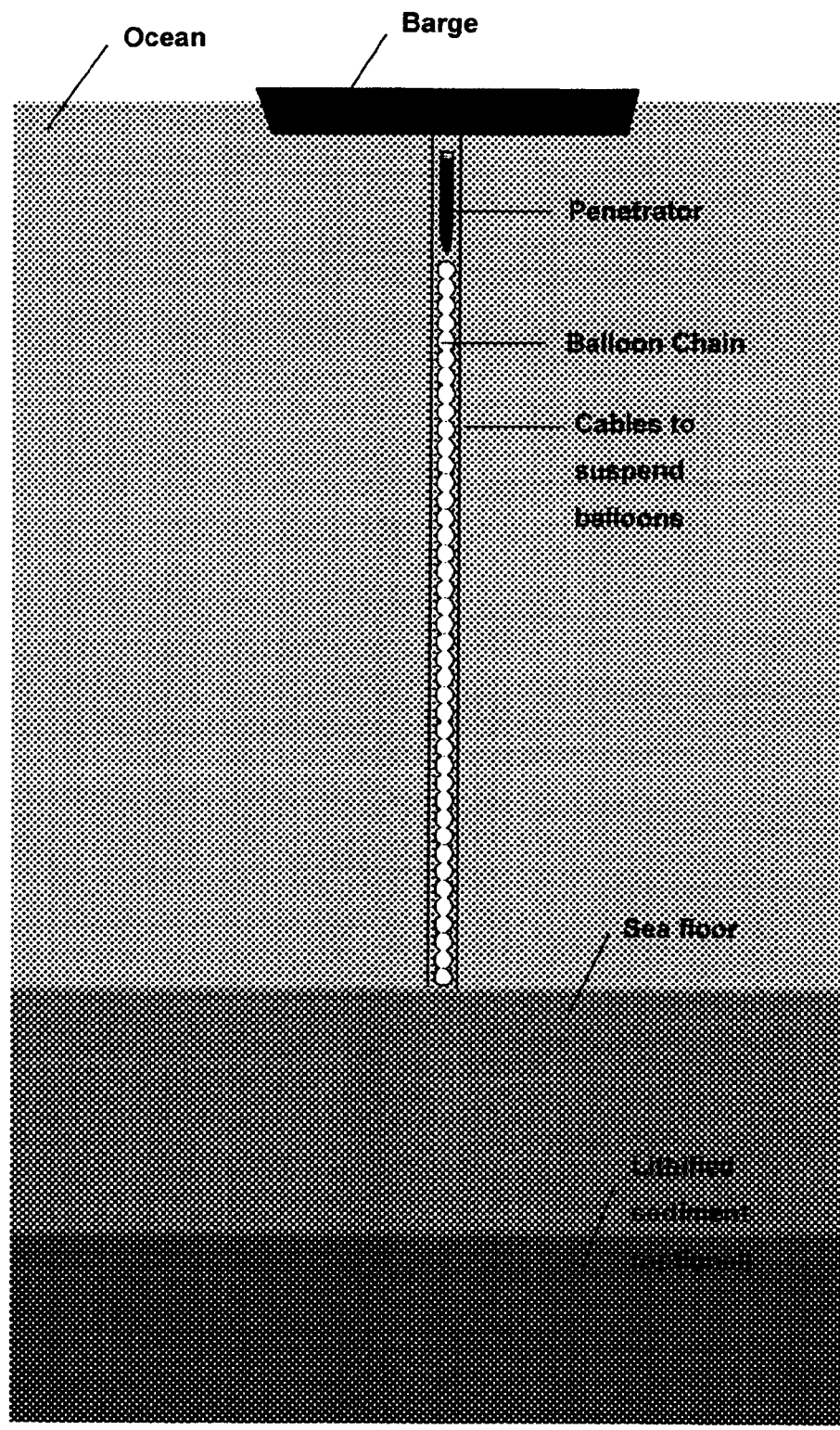
FIG. 1a shows a side view of the preferred embodiment: a penetrator suspended from a barge over a chain of balloons that stretches to the sea floor.
Figure 2:
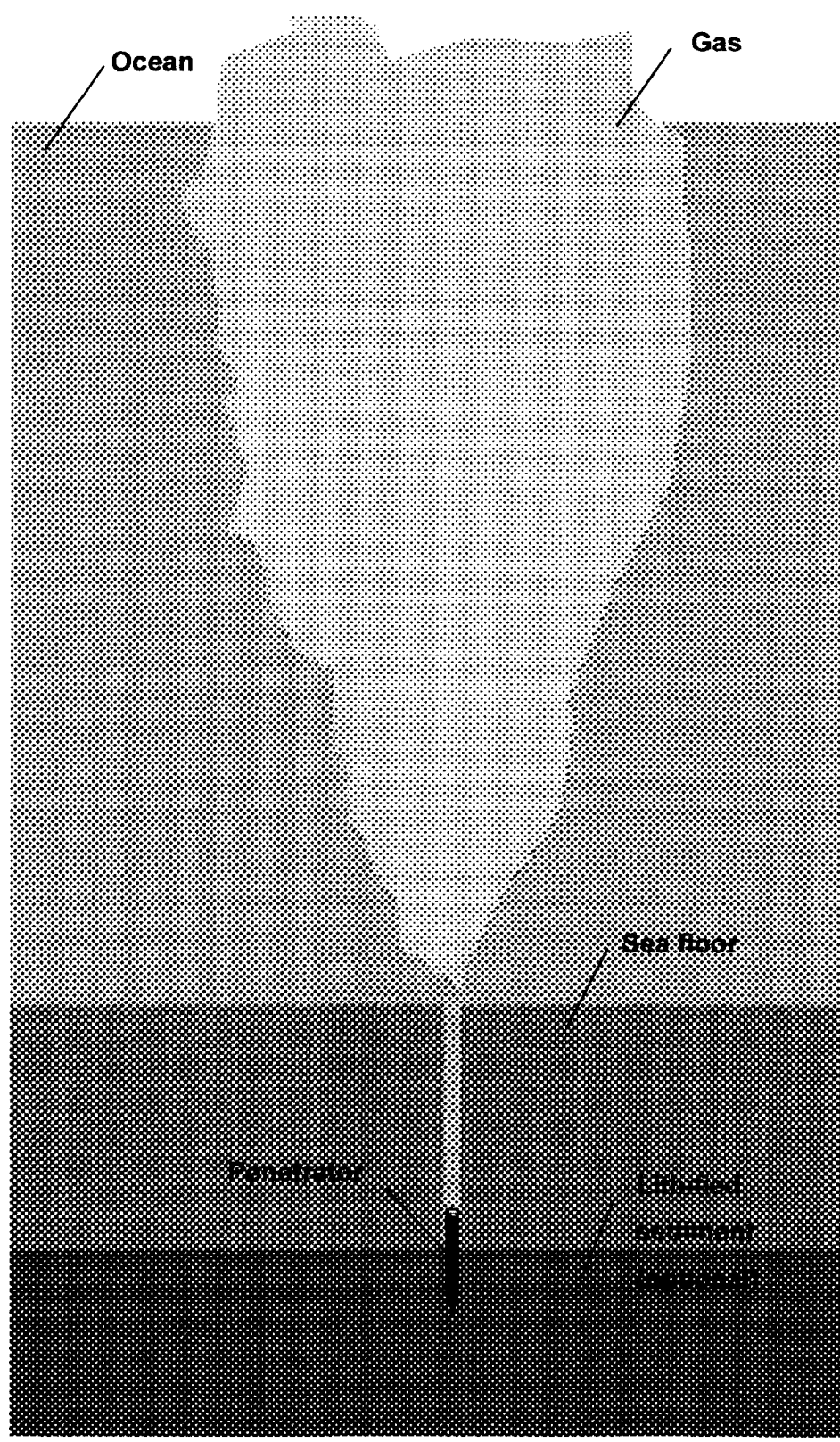
Figure 3:
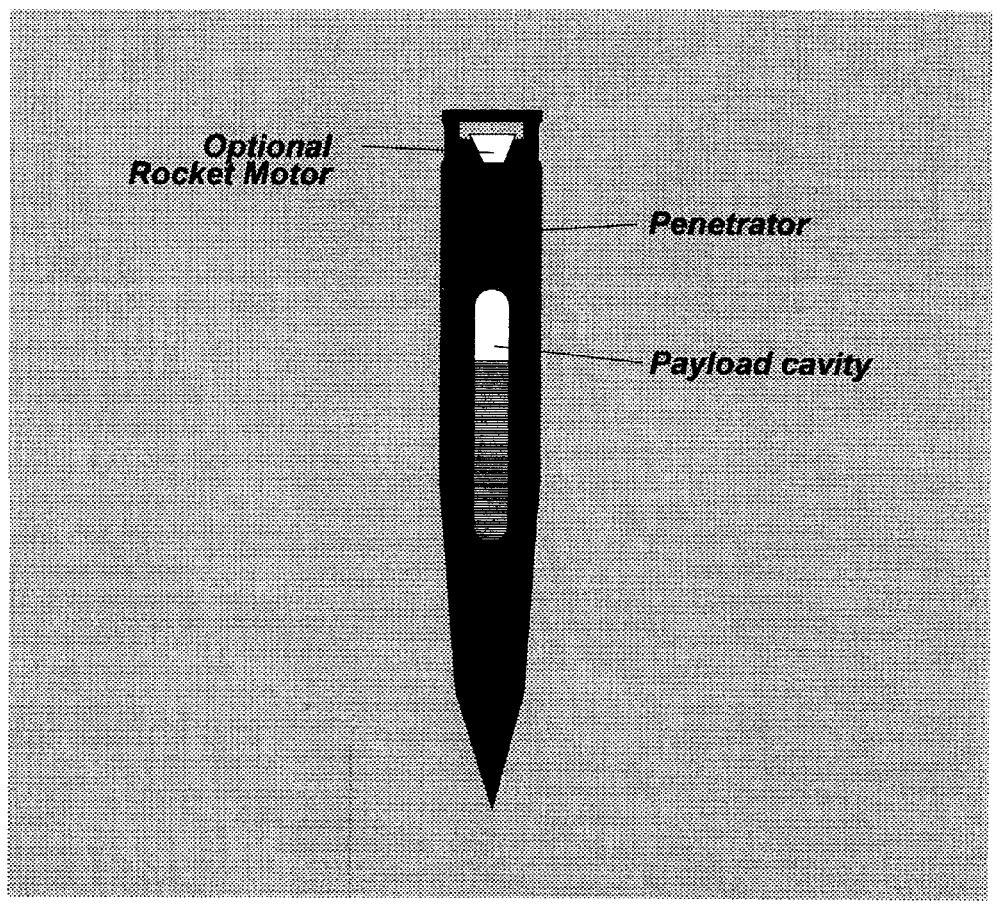
FIG. 3 shows a coronal cross-section of a penetrator including the payload cavity and optional rocket nozzle location.

However, to reach such speeds, friction with the water must be minimized. It is possible to construct beforehand a path to the bottom that is principally through air, not water. One option is to suspend a contiguous chain of individually-filled balloons from the surface to the bottom of the ocean so that a projectile would fly through them in sequence on its way to the bottom. If the balloons were cylindrical, 2 m in diameter and each 5 m high containing a pressure differential of 0.5 atmosphere relative to its neighbors, 500 balloons would be needed to reach from the surface to the bottom at the East Pacific Rise. (FIG. 1a) The balloons may be of identical size and construction, but at successively higher pressures (although at the same relative pressure to its surrounding water) and therefore containing increasing masses of gas with depth. Therefore the ~3750 psi differential between surface and bottom is accommodated by ~7.5 psi per balloon. Obviously, if higher pressures are permitted, lower numbers of balloons may be used.

Gas under high pressure will have much increased drag relative to that at sea level, but is nonetheless vastly superior to water drag. It is important to fill the balloons at the deepest depths with a gas such as hydrogen or helium which will not liquefy at the low temperature and high pressures encountered on the sea floor (for 2.5 km, that is 250 At). Hydrogen could be generated on-site from seawater. The total volume of gas in this scenario is large, on the order of 1 million cubic meters for a 2.5 km, 2 m-diameter balloon chain. A tremendous depth-charge-like explosive force will be released by this gas rising to the surface.

The balloon chain forms an empty "air" tunnel with water "walls" that can be used to guide a penetrator at low speed to target without need of a guidance system, however, at maximum speed nearly all contact with the guide walls must be eliminated or the penetrator will likely go out of control (i.e. a guidance system is necessary). It is therefore desirable to align the balloon chain as nearly perfectly vertically as possible, especially those segments toward the end of the chain. To this end cables extending from mid points of the chain and anchored to the bottom may be used to compensate for the force of undersea currents, and target areas selected that have minimal currents. It is also possible to increase the size of the balloons with depth to allow for accumulated guidance error.

In the preferred embodiment, the balloons are suspended, one above the other, from cables that hang on 3 or more sides of the balloons, creating a central corridor through which the projectile will pass. The cables are anchored to the sea floor and must be able to support their own weight until the balloons are filled, after which the structure may actually have positive buoyancy so as to stiffen the structure against undersea currents. After launch, the support structure from which the cables are suspended may sink (due to the rising gas), and the cables lost.

Figure 4:
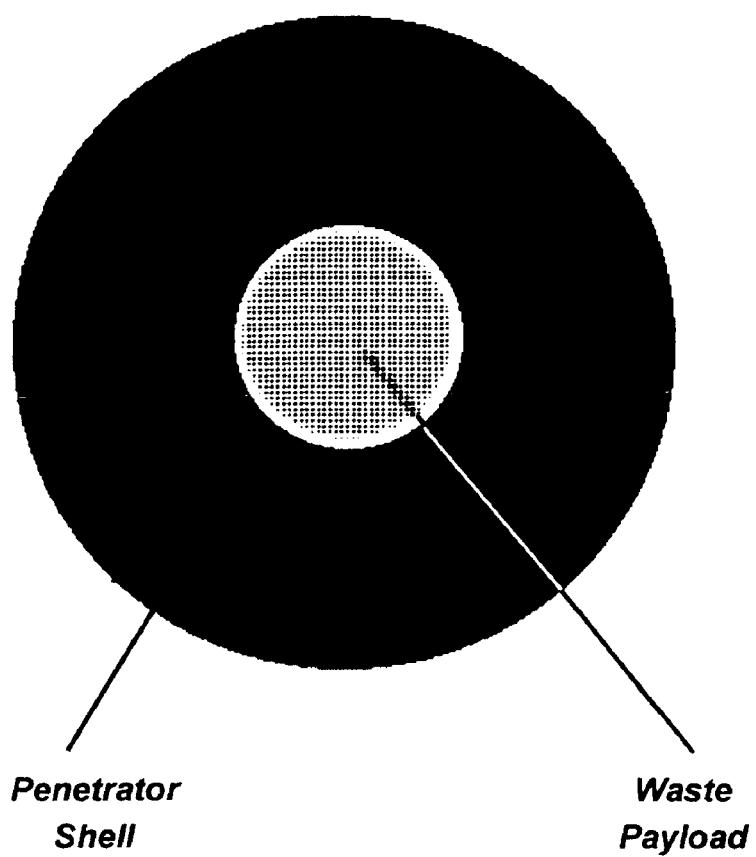
FIG. 4 shows an axial cross-section of a penetrator through the payload cavity and payload.

Classical balloons may be replaced by an open-bottomed system of deformable membranes that become balloon-like as they are filled from below with gas. Because they are open in the bottom the entire chain can be filled from below with a single stream of gas, each stage overflowing and spilling gas to the stage above, much as a stack of champagne classes will spill champagne downwards as each fills to overflowing. The head of each balloon nestles below the throat of the balloon above and the tie points of each succeeding balloon may be rotated so that the overflow points of one balloon overlap the catchpoints of the balloon above (increasing the efficiency of spilled gas capture). In this system the entire stack of balloons must be wrapped with an outer membrane to prevent ocean currents from disturbing the filling or filled balloons. (FIG. 4 illustrates a 4-cable system with and without rotation) It is also important to note that gas will be lost into solution in the surrounding water and that the outer wrapper also limits total gas absorption by saturating water between the outside of the deformable inner membranes ("balloons") and the outer wrapper membrane.

The balloon chain apparatus may be replaced by a suspended sequence of chemical charges that are detonated in sequence from surface to seafloor so as to dynamically create a moving gas bubble. The charges scale up in size with depth, so that the deepest charge has approximately (d/10 m) the gas evolution potential as that charge used near the surface. If they are spaced linearly, they will also detonate at an accelerating rate corresponding to the acceleration of the projectile itself. An anticipation must be programmed into the detonation to allow the combustion process and bubble expansion to reach fulfillment by the time the projectile arrives.

It is also possible for the projectile to generate its own gas bubble, along the lines suggested by Eichenberger, although dramatically complicated by the rapidly increasing pressure with depth (Lee and Eichenberger teach essentially isobaric methods) At shallow depths, a modest gas exhaust from the nose of the projectile will serve to enclose it in a gas bubble, however rapidly-increasing volumes of gas are required with depth. Towards the bottom, essentially a reverse rocket motor is needed to evolve the needed gas coating. Envisioned projectile velocities (hundreds of meters/second) are not high enough to sustain a supercavitating bubble at the high pressures of multiple-km depths.

The materials and construction details strongly depend on the payload, target depth and seafloor type, but the same basic design can be used to target different types of sediment. One likely target might be pelagic clay located in a isolated, geologically stable area. For such a target the penetrator would likely be built somewhat more narrowly, less stoutly so as to maximize penetration on the presumption such sediments would be relatively "soft". (Although at the speeds envisioned, quite hard absolutely). Deeper terrigenous sediments might require a different design methodology and basaltic targets a third. The unifying principle is the ballistic method enhanced by drag reduction.

What is claimed is:

1. A system for disposal of hazardous materials in deep water, comprising
    a) A downward-facing projectile with space for storage of said hazardous materials;
    b) Discrete and nominally stationary means for reducing water drag on said projectile by displacement of said water with gas along the trajectory of said projectile.

2. The system of claim 1, where said stationary means for reducing water drag is a vertically-oriented chain of balloons that are popped by the descending projectile.

3. The system of claim 1, where said stationary means for reducing water drag is a chain of static explosive charges, arranged in a vertical chain that burn in a sequence to dynamically create said water-displacing gas in advance of said projectile.

4. The system of claim 1, where said stationary means for reducing water drag includes both balloons and explosives.

5. The system of claim 3, additionally comprising gas evolved in flight by said projectile as an additional means of water drag reduction.

6. The system of claim 1, additionally comprising a rocket motor for at least a first purpose of accelerating said projectile.

7. A system for embedding materials in ocean or lake sediment, comprising a projectile and vertically oriented chain of subsurface balloons extending to or near to said ocean or lake sediment.

8. A system for embedding materials in ocean or lake sediment, comprising a projectile and a subsurface chain of static explosive charges arranged in a vertical chain and that burn in a sequence to create a moving gas column that precedes the projectile.

* * * * *